United States Patent
Ide et al.

(10) Patent No.: US 9,690,664 B2
(45) Date of Patent: Jun. 27, 2017

(54) STORAGE SYSTEM AND METHOD FOR CONTROLLING THE SAME

(71) Applicant: HITACHI, LTD., Tokyo (JP)

(72) Inventors: Kyohei Ide, Tokyo (JP); Naoki Moritoki, Tokyo (JP); Sumihiro Miura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 309 days.

(21) Appl. No.: 14/424,926

(22) PCT Filed: Mar. 13, 2014

(86) PCT No.: PCT/JP2014/056604
§ 371 (c)(1),
(2) Date: Feb. 27, 2015

(87) PCT Pub. No.: WO2015/136655
PCT Pub. Date: Sep. 17, 2015

(65) Prior Publication Data
US 2016/0259726 A1 Sep. 8, 2016

(51) Int. Cl.
*G06F 11/00* (2006.01)
*G06F 11/14* (2006.01)
*G06F 3/06* (2006.01)
*G06F 12/08* (2016.01)
(Continued)

(52) U.S. Cl.
CPC ............ *G06F 11/1441* (2013.01); *G06F 3/06* (2013.01); *G06F 11/16* (2013.01);
(Continued)

(58) Field of Classification Search
CPC .. G06F 11/16; G06F 11/1441; G06F 11/2015; G06F 11/2094; G06F 1/30; G06F 12/0866; G06F 12/0868; G06F 13/00
See application file for complete search history.

(56) References Cited

U.S. PATENT DOCUMENTS

| 5,519,831 A * | 5/1996 | Holzhammer ...... G06F 11/1441 365/228 |
| 2004/0175598 A1 * | 9/2004 | Bliven ...................... H02J 7/34 713/340 |

(Continued)

FOREIGN PATENT DOCUMENTS

| JP | 2010-039578 A | 2/2010 |
| JP | 2011-159124 A | 8/2011 |
| JP | 2012-005170 A | 1/2012 |
| JP | 2013-088928 A | 5/2013 |

*Primary Examiner* — Joshua P Lottich
(74) *Attorney, Agent, or Firm* — Volpe and Koenig, P.C.

(57) ABSTRACT

The present invention provides a storage system capable of preventing data loss when power failure or other failures occur to an external power supply, by determining whether the capacity corresponding to the write data can be saved from a volatile memory to a nonvolatile memory based on a charged capacity of a battery used as an internal power supply and a non-backed-up (not yet backed-up) data capacity from the volatile memory to the nonvolatile memory, when storing data from a host computer or a system drive to the volatile memory of the storage system. If it is determined that saving of data is possible, an area corresponding to the write data capacity is allocated in the volatile memory and data is written to the allocated area, but if it is determined that saving of data is not possible, the writing of data is suppressed.

9 Claims, 20 Drawing Sheets

(51) Int. Cl.
*G06F 13/00* (2006.01)
*G06F 12/0866* (2016.01)
*G06F 11/16* (2006.01)
*G06F 11/20* (2006.01)
*G06F 12/0804* (2016.01)
*G06F 12/0868* (2016.01)

(52) U.S. Cl.
CPC .......... *G06F 11/2094* (2013.01); *G06F 12/08* (2013.01); *G06F 12/0804* (2013.01); *G06F 12/0866* (2013.01); *G06F 12/0868* (2013.01); *G06F 13/00* (2013.01); *G06F 2201/805* (2013.01); *G06F 2212/1032* (2013.01); *G06F 2212/214* (2013.01); *G06F 2212/313* (2013.01)

(56) References Cited

U.S. PATENT DOCUMENTS

| | | | |
|---|---|---|---|
| 2007/0094446 A1* | 4/2007 | Sone | G06F 1/263 |
| | | | 711/113 |
| 2010/0030989 A1 | 2/2010 | Nakashima et al. | |
| 2011/0191535 A1 | 8/2011 | Yuasa | |
| 2013/0097451 A1 | 4/2013 | Kuroda et al. | |
| 2013/0097458 A1* | 4/2013 | Sekino | G06F 11/1441 |
| | | | 714/6.3 |
| 2014/0019677 A1* | 1/2014 | Chang | G06F 12/0804 |
| | | | 711/105 |
| 2016/0011799 A1* | 1/2016 | Yu | G06F 3/0616 |
| | | | 711/103 |

* cited by examiner

Fig. 8

| AREA ID | START ADDRESS | END ADDRESS | ALLOCATION FLAG | MEMORY WRITE COMPLETION FLAG |
|---|---|---|---|---|
| AREA 0 | Start Address 0 | End Address 0 | 0 | 0 |
| AREA 1 | Start Address 1 | End Address 1 | 1 | 0 |
| AREA 2 | Start Address 2 | End Address 2 | 1 | 1 |

Fig. 17

| AREA ID | MEMORY WRITE ACCESS HEADER (INCLUDING START ADDRESS, TRANSFER LENGTH) | NON-BACKED-UP FLAG |
|---|---|---|
| AREA 0 | HEADER 0 | FLAG 0 |
| AREA 1 | HEADER 1 | FLAG 1 |
| AREA 2 | HEADER 2 | FLAG 2 |

STORAGE SYSTEM AND METHOD FOR CONTROLLING THE SAME

TECHNICAL FIELD

The present invention relates to a storage system and a method for controlling the same.

BACKGROUND ART

Conventionally, server systems and storage systems in data centers and hospitals adopt a UPS (Uninterruptible Power Supply), which enables the systems to continue operation even during power failure or other external power supply failures. Actually, the system can be operated continuously by starting an internal power generating device during continuous operation using the UPS.

Further, regarding the art related to failure correspondence, an art is disclosed where control is performed in response to the type of the data stored in a cache memory or the remaining battery power when external power supply is cut off due to failure, to thereby protect the data in the cache, which is a volatile memory, while reducing the power consumption of the battery power supply. However, according to the conventional system adopting the UPS, there was a drawback in that the costs of the batteries used for the UPS and the installation costs were high.

Even further, there were cases where the system could not be stopped safely when there were no internal power generating device installed in the system, or when it was assumed that the stopping of the power supply will continue for a long time. Patent Literature 1 discloses an art corresponding to such problems. The disclosed art provides a computer capable of stopping the system safely and with a low cost. Actually, the computer includes a nonvolatile memory for storing data, a control processor for controlling the saving of data to the nonvolatile memory, and a battery for supplying power to the computer when failure occurs to an external power supply, which is characterized in that a control processor confirms a charged quantity of power accumulated in the battery, computes based on the confirmed charged quantity the amount of data savable to a nonvolatile memory using the battery when failure occurs to the external power supply, and saves the amount of data excluding the savable data quantity from the data to be saved to the nonvolatile memory in advance to the nonvolatile memory.

CITATION LIST

Patent Literature

[PTL 1] US Patent Application Publication No. 2013/0097451
(Japanese Patent Application Laid-Open Publication No. 2013-088928)

SUMMARY OF INVENTION

Technical Problem

In the art disclosed in Patent Literature 1, data of a data quantity excluding the savable data quantity is saved in advance in the nonvolatile memory. However, when external power supply failure occurs due to power failure or the like during or before the saving of data, not all the data to be saved may be saved in the nonvolatile memory, so that a portion or all of the data to be saved may be lost. Therefore, the present invention aims at providing a storage system capable of preventing data loss when external power supply failure occurs.

Solution to Problem

In order to solve the problems of the prior art, when storing data from a host computer or a system drive in the volatile memory of the storage system, the storage system according to the present invention determines whether the capacity of write data can be saved from the volatile memory to the nonvolatile memory, based on a charged capacity of battery as internal power supply and a non-saved (non-backed-up) data capacity of the volatile memory to the nonvolatile memory. If it is determined that saving is possible, an area corresponding to a write data capacity is allocated to the volatile memory and data is written to that area, but if it is determined that saving is not possible, writing of data is suppressed.

Advantageous Effects of Invention

According to the storage system of the present invention, data required to be saved can be stored in a volatile memory after allocating an area in the nonvolatile memory for saving the data from the volatile memory using the internal power supply, so that data can be saved without fail in the nonvolatile memory. Therefore, data loss can be prevented, and the overall reliability of the storage system can be improved. The problems, configurations and effects other than those mentioned above are made clear by the preferred embodiments described below.

BRIEF DESCRIPTION OF DRAWINGS

FIG. 8 is a view illustrating a configuration example of a management table 1 managing the area allocation and write complete statuses.

FIG. 17 is a view illustrating a configuration example of a management table 2 managing the status of area allocation and backup.

DESCRIPTION OF EMBODIMENTS

Figure 1:
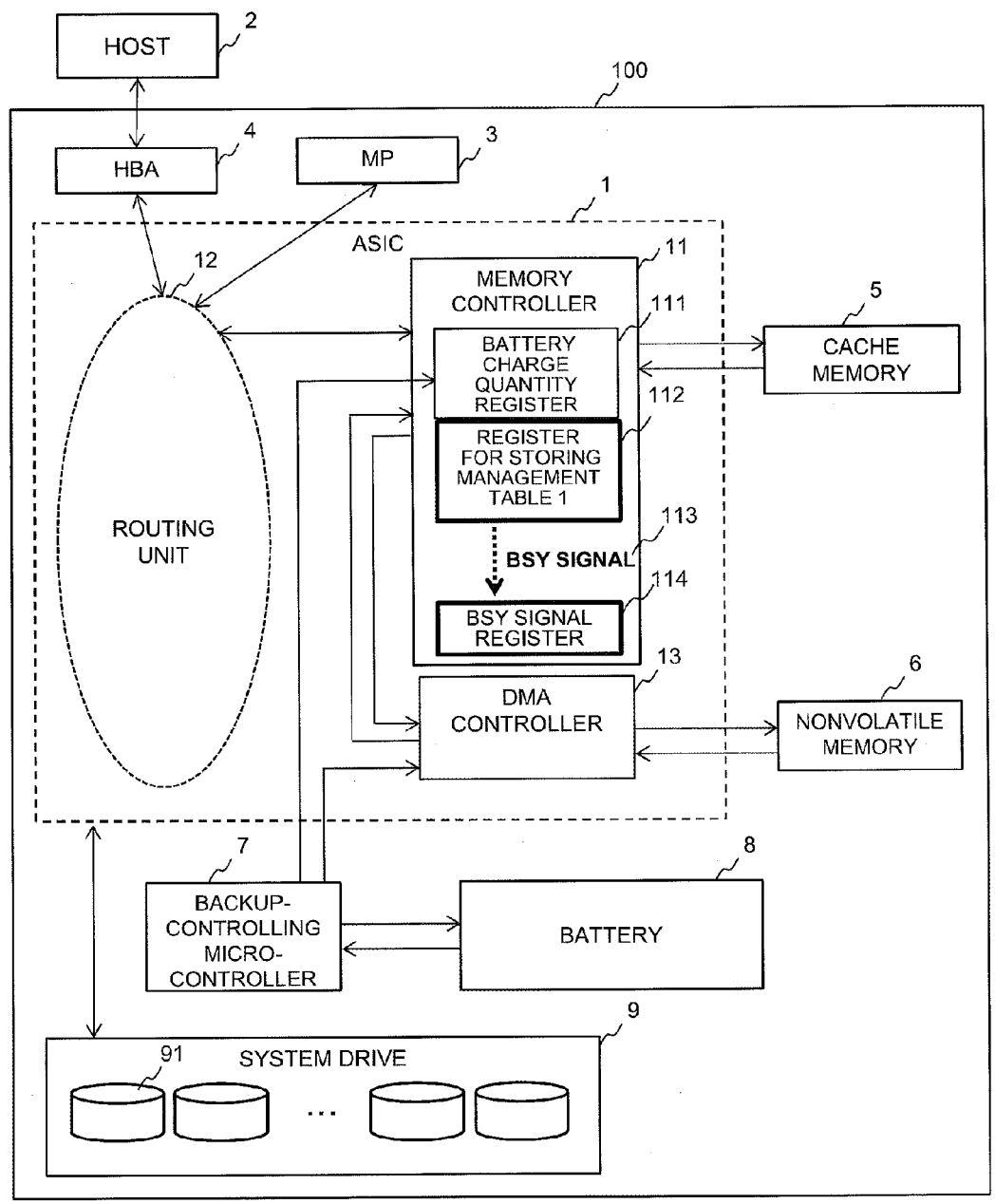
FIG. 1 is an overall block diagram of a first storage system.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

<Overall System Configuration 1>

FIG. 1 is an overall block diagram of a first storage system. We will describe a method (control method 1) having a resistor storing a management table 1 within a memory controller. A storage system 100 connects to a host computer 2 to store data from the host computer 2 or to provide data stored in the storage system 100 to the host computer 2.

The storage system 100 has an MP 3 for controlling the whole system, an HBA (Host Bus Adapter) 4 for connecting to the host computer 2, a cache memory 5 composed of a volatile memory such as a DRAM (Dynamic Random Access Memory) and the like for temporarily storing the data and the like transmitted from the host computer 2 or a system drive 9, a nonvolatile memory 6 composed of a flash memory and the like for performing backup of the contents of the cache memory 5, a microcontroller 7 for backup control (hereinafter referred to as a backup-controlling microcontroller 7), a chargeable/dischargeable battery 8 for supplying power during backup, a system drive 9 composed of multiple HDDs (Hard Disk Drives) 91, and an ASIC (Application Specific Integrated Circuit) 1. The ASIC 1 is a controller for controlling accesses to the HBA 4, the system drive 9, the cache memory 5 and the nonvolatile memory 6. Although not illustrated, the HBA 4 has a buffer built therein for temporarily storing data from the host computer 2.

Further, the ASIC 1 includes a memory controller 11, a routing unit 12 for arbitrating accesses between the HBA 4, the MP 3 and the memory controller 11, and a DMA (Direct Memory Access) controller 13, wherein the memory controller 11 and the DMA controller 13 controls accesses to the cache memory 5 and the nonvolatile memory 6. The DMA controller 13 can be externally connected, instead of being built into the ASIC 1.

The memory controller 11 has a battery charge quantity register 111 for storing the charged power capacity (hereinafter referred to as charged quantity) of the battery 8 measured by the backup-controlling microcontroller 7, a register 112 storing the management table 1 for managing the status of backup of the cache memory 5 to the nonvolatile memory 6, a BSY (Busy) signal 113 for controlling data storage to the cache memory 5, and a BSY signal register 114 for storing the status of the BSY signal 113. The battery 8 is a chargeable/dischargeable secondary battery, which can be a nickel-hydrogen type battery or a lithium ion type battery, for example, but are not limited thereto. A capacitor having a large capacity can be used instead of, or in parallel with, the battery. Further, during power failure of the storage system 100, the MP 3 or the HBA 4 which consume a large amount of power are not operated, and only the ASIC 1, the cache memory 5, the nonvolatile memory 6 and the backup-controlling microcontroller 7 are operated by the battery 8 to perform data backup.

At first, the memory controller 11 of the ASIC 1 calculates the data capacity capable of being subjected to backup, based on a charged quantity set to the battery charge quantity register 111 periodically by the backup-controlling microcontroller 7, using hardware (logical circuit) within the ASIC 1 or a microprogram operating in the ASIC 1 or the MP 3. The result is set as a backup enabled area (C).

Next, the memory controller 11 calculates a data capacity of a non-backed-up area (backup required area) based on a start address and an end address of the area where an allocation flag (mentioned later) in the register 112 storing the management table 1 is set by the MP 3. The result of this calculation is set as a non-backed-up area (D).

When the data capacity of the backup enabled area (C) is smaller than the data capacity of the non-backed-up area (D) (backup enabled area (C)<non-backed-up area (D)), the memory controller 11 asserts the BSY signal 113. When the BSY signal 113 is asserted, the BSY signal register 114 is set, and the set status of the BSY signal register 114 is monitored by the memory controller 11, so as to prevent data from being written (flow-in of data) to the cache memory 5. Further, if the data capacity of the backup enabled area (C) is greater than the data capacity of the non-backed-up area (D) (backup enabled area (C)>non-backed-up area (D)), the memory controller 11 negates the BSY signal 113, and allows data to be written to the cache memory 5.

That is, the storage system 100 according to the present invention controls the writing of data from the host computer 2 or the system drive 9 to the cache memory 5 via a BSY signal, and when power supply from outside the system is cut off due to power failure or the like, enables backup to the nonvolatile memory 6 without failure using only the charged quantity in the battery 8. The memory controller 11 periodically starts the DMA controller 13, and copies the non-backed-up area in the cache memory 5 to the nonvolatile memory 6 for backup.

<Overall System Configuration 2>

Figure 2:
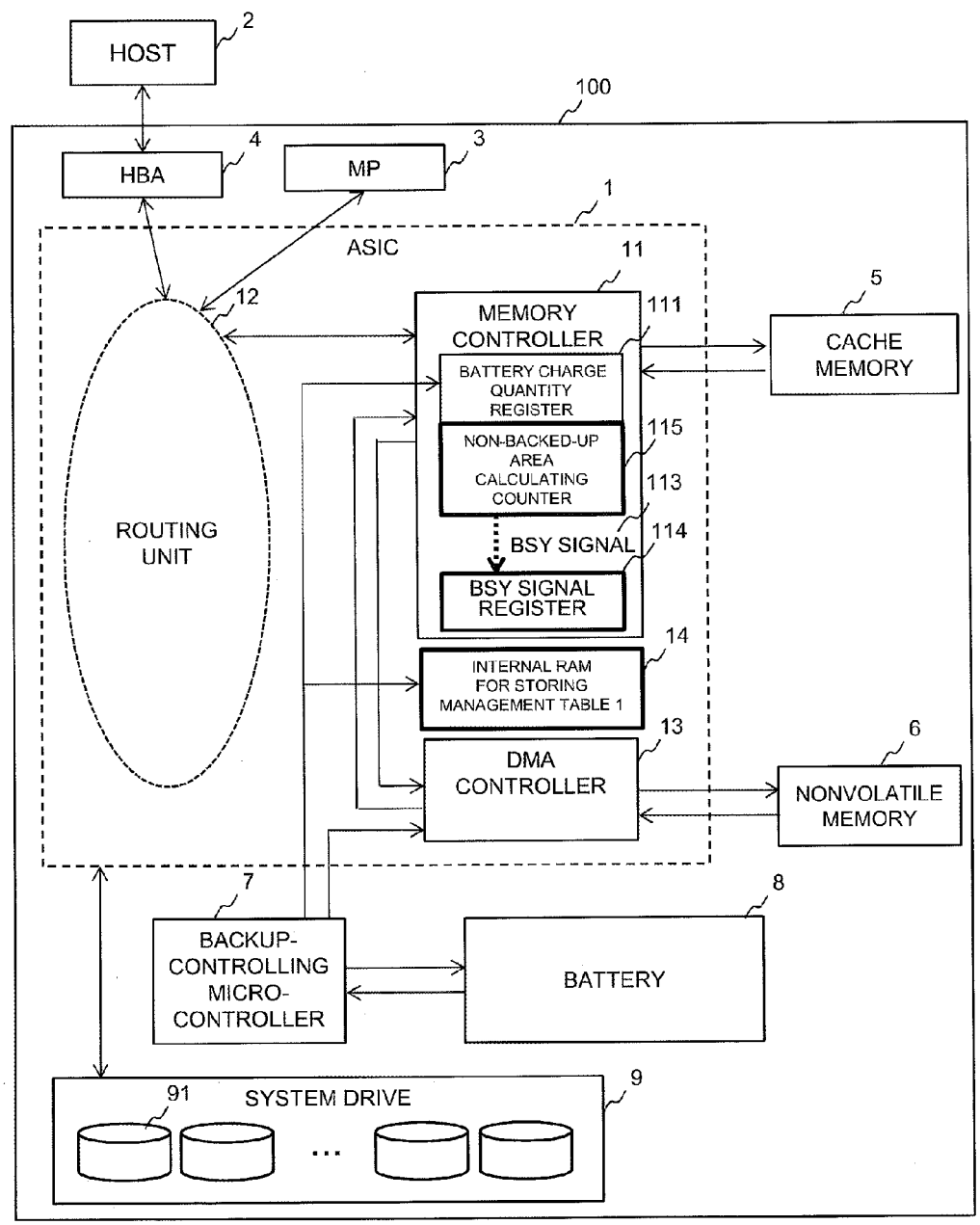
FIG. 2 is an overall block diagram of a second storage system.

FIG. 2 is an overall block diagram of a second storage system. FIG. 2 illustrates a method (control method 2) where the memory controller 11 has a non-backed-up area calculating counter 115, and stores a management table 1 in an internal RAM. Only the differences from FIG. 1 are described with reference to FIG. 2.

The non-backed-up area calculating counter 115 is a counter for calculating the data capacity (storage capacity) of the non-backed-up area. According to the present control method 2, capacity of write data calculated based on the start address and the end address of a memory write access header is incremented by the MP 3 at the timing of memory write. Further, at the timing of completion of data backup from the cache memory 5 to the nonvolatile memory 6, the backup-controlling microcontroller 7 decrements the counter value of the non-backed-up area calculating counter 115 by the backup data capacity.

Further according to a control method 3 described later, the memory controller 11 of the ASIC 1 calculates the capacity of write data based on a transfer length included in the memory write access header at the timing of memory write, and increments the counter value of the non-backed-up area calculating counter 115 by the calculated capacity. Further, at the timing of completion of data backup to the nonvolatile memory 6, the backup-controlling microcontroller 7 decrements the counter value of the non-backed-up area calculating counter 115 by the backup data capacity.

The storage location of the management table 1 according to control method 2 is changed from a management table storage register 112 within the memory controller 11 of control method 1 to an internal RAM 14 for storage disposed outside the memory controller 11. This is because if the size of the management table 1 is large, it may be possible that the management table 1 cannot be stored in the register 112, so that the management table 1 is stored in a RAM capable of storing a large capacity of data to solve the problem.

At first, the memory controller 11 calculates a data capacity capable of being backed up based on a charged quantity periodically set by the backup-controlling microcontroller 7 to the battery charge quantity register 111. The result thereof is set as the backup enabled area (C). Next, the memory controller 11 acquires the data capacity of the non-backed-up area from the non-backed-up area calculating counter 115. The acquired result is set as the non-backed-up area (D).

Then, if the data capacity of the backup enabled area (C) is smaller than the data capacity of the non-backed-up area (D) (backup enabled area (C)<non-backed-up area (D)), the memory controller 11 asserts the BSY signal 113. When the BSY signal 113 is asserted, the BSY signal register 114 is set, and the set status of the BSY signal register 114 is monitored by the memory controller 11, based on which writing of data (flowing in of data) to the cache memory 5 is suppressed.

If the data capacity of the backup enabled area (C) is greater than the data capacity of the non-backed-up area (D) (backup enabled area (C)>non-backed-up area (D)), the BSY signal 113 is negated, and the writing of data to the cache memory 5 is permitted.

<BSY Signal Generation 1>

Figure 3:
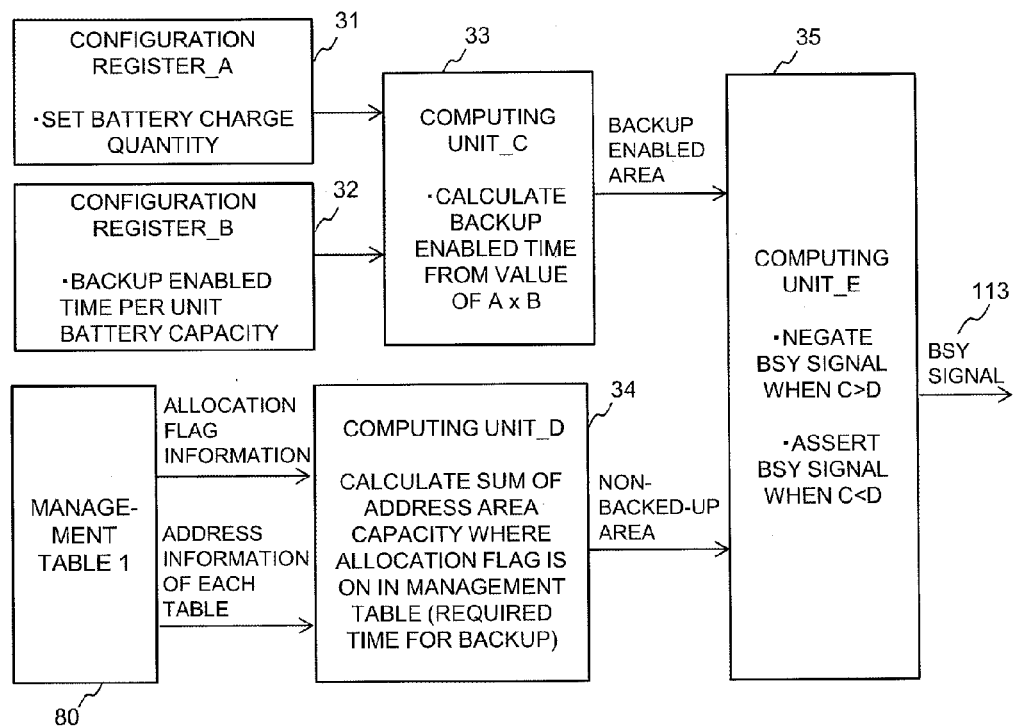
FIG. 3 is a view illustrating a first computing method fog generating a BSY signal.

FIG. 3 is a view illustrating a first computing method for generating a BSY signal. A configuration register_A 31 is a register for setting the charged quantity of the battery, wherein the backup-controlling microcontroller 7 periodically measures the charged quantity of the battery 8 and the measured result is set.

A configuration register_B 32 is a register for setting a backup enabled time per unit battery capacity (or backup enabled capacity). The value to be set to the configuration register_B 32 is determined by a rated charge capacity of the implemented battery 8, the implemented cache memory capacity, and so on. It is also possible to set up a backup enabled data capacity per unit battery capacity to the configuration register_B 32.

A computing unit_C 33 multiplies the set value of the configuration register_A 31 by the set value of the configuration register_B 32, and based on the result of multiplication, calculates the backup enabled time (or backup enabled capacity). Based on the calculated result, the time of the backup enabled area (or capacity) is calculated. This is set as the backup enabled time or backup enabled capacity (C).

A computing unit_D 34 acquires an address information where the allocation flag is set to ON in the management table 1 80. Then, based on the acquired address information, the total sum of data capacity requiring backup in the address area is calculated. Based on the result, the required backup time a required backup time of the non-backed-up area is calculated. This is set as the required backup time or required backup capacity (D).

A computing unit_E 35 is a computing unit for generating the BSY signal 113, wherein if the aforementioned backup enabled time or backup enabled capacity (C) is greater than the required backup time or required backup capacity (D) ((C)>(D)), it negates the BSY signal 113, and if (C) is smaller than (D) ((C)<(D)), it asserts the BSY signal 113.

As described, if the backup enabled time or the backup enabled capacity is greater than the required backup time or required backup capacity ((C)>(D)), it is determined that the non-backed-up data in the cache memory 5 can be saved in the nonvolatile memory 6 using the power charged in the battery 8 even during power failure, so that writing of data to the cache memory 5 is permitted. On the other hand, if (C) is smaller than (D) ((C)<(D)), it is determined that the non-backed-up data in the cache memory 5 cannot be saved in the nonvolatile memory 6 by the power charged in the battery 8 during power failure, so that the writing of data to the cache memory 5 is prohibited.

<BSY Signal Generation 2>

Figure 4:
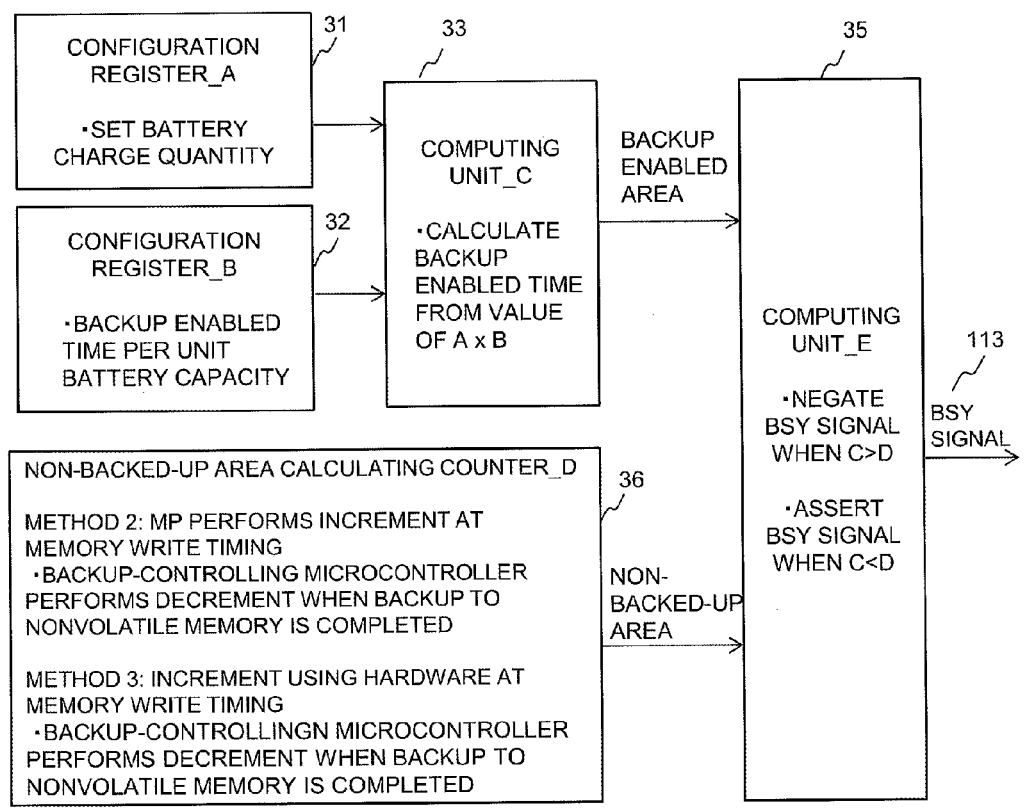
FIG. 4 is a view illustrating a second computing method for generating a BSY signal.

FIG. 4 is a view illustrating a second computing method for generating the BSY signal. Here, only the differences from the method illustrated in FIG. 3 will be described. According to the second computing method, a non-backed-up area calculating counter_D is disposed instead of the management table 1 80 and the computing unit_D 34. The following two control methods are provided as the function of the non-backed-up area calculating counter_D.

(1) Control Method 2

At the timing of memory write, the MP 3 increments a counter value of the non-backed-up area calculating counter 115 (data capacity of the non-backed-up data). Thereafter, at the timing of completion of backup to the nonvolatile memory, the backup-controlling microcontroller 7 decrements the counter value of the non-backed-up area calculating counter 115.

(2) Control Method 3

At the timing of memory write, the memory controller 11 (or a hardware logical circuit within the ASIC 1) increments the counter value of the non-backed-up area calculating counter 115 (data capacity of the non-backed-up data). Thereafter, at the timing of completion of backup to the nonvolatile memory, the backup-controlling microcontroller 7 decrements the counter value of the non-backed-up area calculating counter 115.

Similar to the control method 1, a computing unit_E 35 compares an output information of the computing unit_C 33 (backup enabled time or backup enabled capacity) and an output information of the non-backed-up area calculating counter_D (required backup time or required backup capacity), and based on the compared result, controls whether to assert or negate the BSY signal. By controlling the writing of data to the cache memory 5 using the BSY signal, the data capacity not yet backed up to the cache memory 5 can be controlled to a value equal to or smaller than the data capacity that can be backed up without fail to the nonvolatile memory 6.

<Data Write Process 1>

Figure 5:
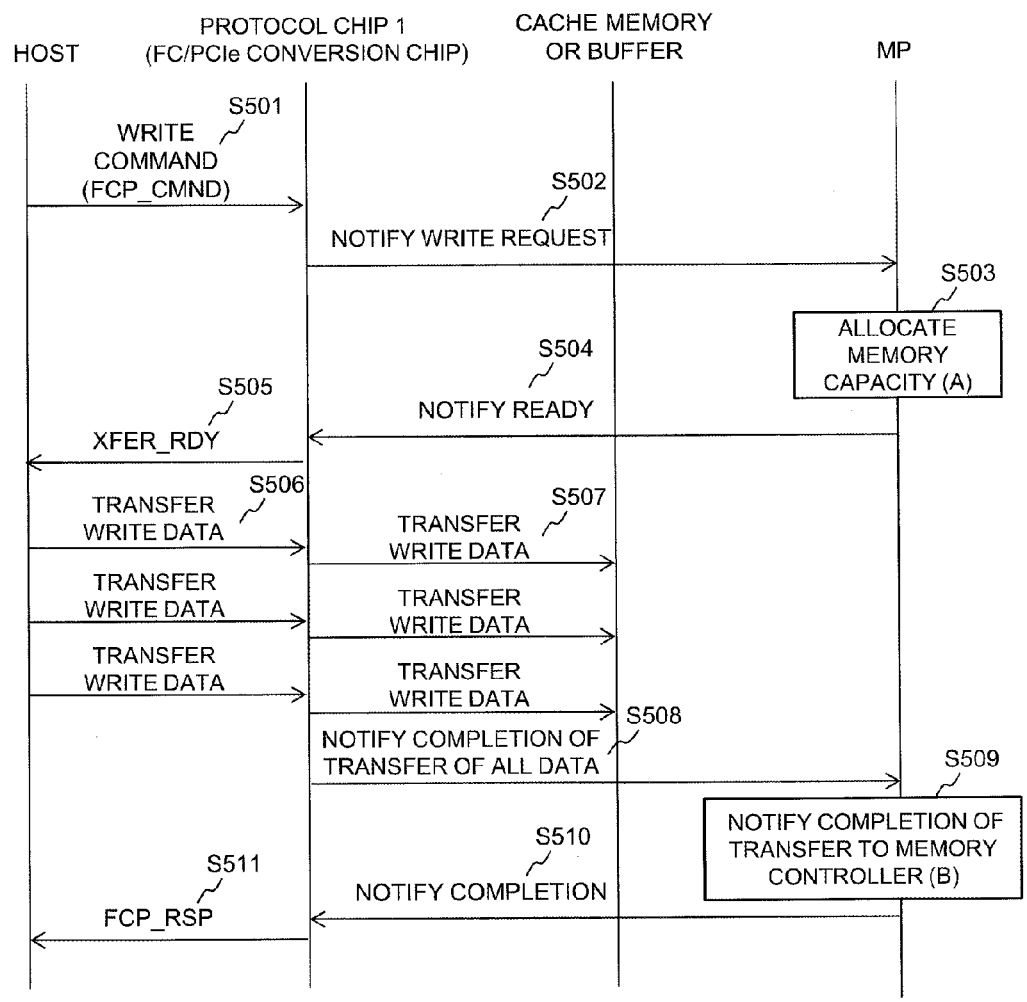
FIG. 5 is a ladder chart illustrating a data write process from a host computer to a cache memory-buffer.

FIG. 5 is a ladder chart illustrating the data write process from the host computer to the cache memory-buffer.

In S501, the host computer 2 issues a write command (FCP_CMND) to the storage system 100. A protocol chip 1 within the HBA 4 of the storage system 100, that is, an FC (Fibre Channel)/PCI-express (PCIe) (Registered Trademark) conversion chip (not shown) receives a write command (FCP_CMND) from the host computer 2, and converts the same to a command format (write request) that can be used within the storage system 100.

In S502, the protocol chip 1 notifies the write request to the MP 3. In S503, the MP 3 allocates an area for storing the write data in the cache memory 5 (memory capacity allocation (A)). The detailed operation of this process will be described with reference to FIGS. 9 and 10.

If the memory capacity could be allocated in S503, the MP 3 notifies a Ready signal to the protocol chip 1 in S504. In S505, the protocol chip 1 converts the received Ready signal to generate an XFER_RDY command (transfer ready completion command), and transmits the XFER_RDY command to the host computer 2. In S506, the host computer 2 transfers a write data to the protocol chip 1. In S507, the protocol chip 1 transfers the write data from the host computer 2 to the cache memory 5 or the buffer of the HBA 4 or the routing unit 12. The data transfer of S506 and S507 are executed for all the write data.

In S508, when transfer of all data to the cache memory 5 or the buffer is completed, the protocol chip 1 transmits a notice that all data transfer has been completed to the MP 3. When the MP 3 receives the notice that transfer of all data has been completed, in S509, the MP 3 notifies completion of transfer to the memory controller 11 (transfer completion notice (B)). In S510, the memory controller 11 transmits a completion notice showing that the all data transfer completion notice has been received to the protocol chip 1. In S511, the protocol chip 1 converts the received completion notice to an FCP_RSP command, and transmits the same to the host computer 2, so as to notify that the data write operation from the host computer 2 has been completed. By the operation from S501 to S511, data can be written from the host computer 2 to the cache memory 5 or the buffer.

<Data Write Process 2>

Figure 6:
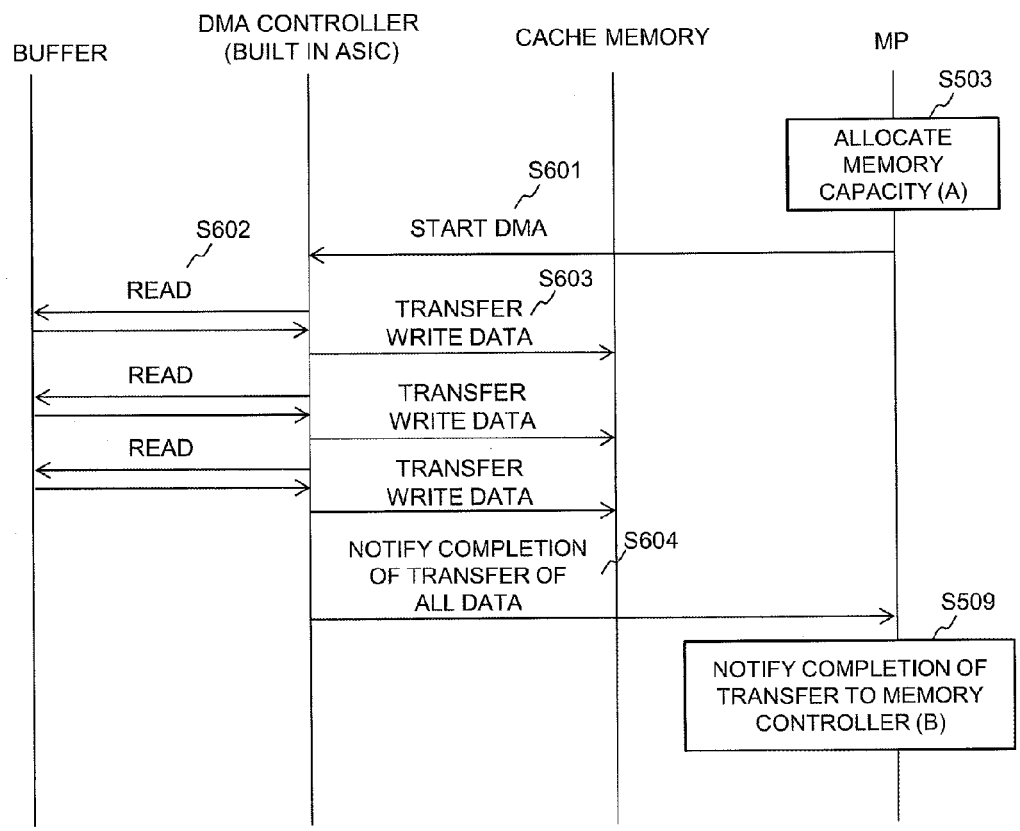
FIG. 6 is a ladder chart illustrating a data write process from a buffer to a cache memory

FIG. 6 is a ladder chart illustrating a data write process from the buffer to the cache memory.

In S503, the MP 3 first allocates the memory capacity (memory capacity allocation (A)), and in S601, the MP 3 starts DMA transfer by the DMA controller 13. In S602, the DMA controller 13 reads the data stored in the buffer. There are a buffer for storing data from the host computer 2 and a buffer for storing data from the system drive 9.

In S603, the DMA controller 13 executes a write data transfer operation for transferring the read data to the cache memory 5. In S604, when the transfer of all data from the buffer to the cache memory 5 has been completed, the DMA controller transmits an all data transfer completion notice to the MP 3. In S509, when the MP 3 receives the all data transfer completion notice, the MP 3 notifies completion of transfer to the memory controller 11 (transfer completion notice (B)).

<Data Read Process>

Figure 7:
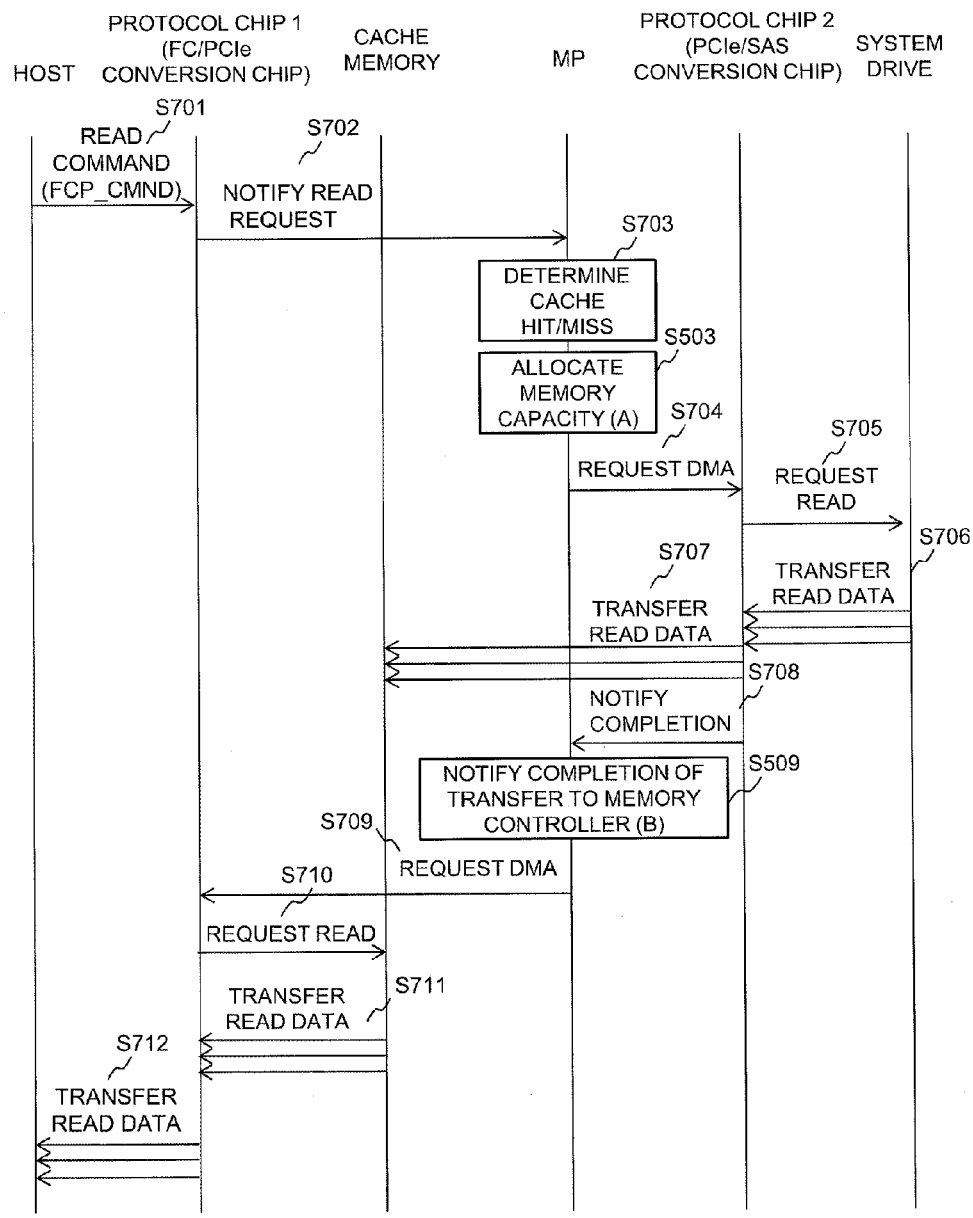
FIG. 7 is a ladder chart illustrating a data read process from a storage system by the host computer.

FIG. 7 is a ladder chart showing a data read process performed by the host computer from a storage system.

In S701, the host computer 2 issues a read command (FCP_CMND) to the storage system 100. The protocol chip 1 (FC/PCIe conversion chip) within the HBA 4 of the storage system 100 receives the read command (FCP_CMND) from the host computer 2, and converts the same to a command format (read request) that can be used within the storage system 100. In S702, the protocol chip 1 transmits the read request to the MP 3.

In S703, the MP 3 determines whether read data corresponding to the read request is stored in the cache memory 5 or not, that is, performs a HIT/MISS determination. If the data is stored in the cache memory 5 (HIT), the MP 3 requests the DMA controller 13 to start DMA, and causes data to be read from the cache memory 5 and the data to be transferred to the protocol chip 1. The protocol chip 1 transmits the data transferred by the DMA controller 13 to the host computer 2. When the read data is not stored in the cache memory 5 (MISS), the MP 3 first executes S503. In S503, the MP 3 allocates a capacity in the cache memory 5 for storing the read data from the system drive 9 (memory capacity allocation (A)).

In S704, the MP 3 requests DMA transfer to a protocol chip 2 (PCIe/SAS conversion chip). In S705, the protocol chip 2 transmits a read request to the system drive 9. In S706, the system drive 9 transfers the read data having been read from the HDD 91 to the protocol chip 2. In S707, the protocol chip 2 transfers the read data from the system drive 9 to the cache memory 5. In S708, when transfer of all read data has been completed, the protocol chip 2 transmits the all data transfer completion notice to the MP 3. In S509, when the MP 3 receives the all data transfer completion notice, the MP 3 notifies completion of transfer to the memory controller 11 (transfer completion notice (B)).

In S709, the MP 3 requests DMA transfer to the protocol chip 1. In S710, the protocol chip 1 having received the DMA transfer request transmits a read request to the cache memory 5. In S711, the cache memory 5 transfers the read data to the protocol chip 1. In S712, the protocol chip 1 transfers the read data to the host computer 2.

As described, also during reading of data (flowing in of data) from the system drive 9 to the cache memory 5, the MP 3 performs memory capacity allocation (A), and allocates the area capable of being backed up to the nonvolatile memory 6 without fail.

<Management Table 1>

FIG. 8 is a view illustrating a configuration example of a management table 1 for managing the statuses of area allocation and write completion. A management table 1 80 comprises an area ID 801 for uniquely identifying a data storage area, a start address 802 and an end address 803 of the data storage area, an allocation flag 804 identifying whether a data storage area has been allocated or not, and a memory write completion flag 805 for identifying whether write to the data storage area has been completed or not.

The allocation flag 804 is set to "1 (ON)" by the MP 3 or the memory controller 11 when the MP 3 has allocated a storage area in the cache memory 5 (memory capacity allocation (A)). Further, the memory write completion flag 805 is set to "1 (ON)" by the MP 3 when all the data write to the cache memory 5 have been completed (transfer completion notice (B)). The allocation flag 804 and the memory write completion flag 805 are set to "0 (OFF)" when the data stored in the cache memory 5 have been backed up to the nonvolatile memory 6.

The data storage area having the area ID 801 set to "area 1" has the allocation flag 804 set to "1" and the memory write completion flag 805 set to "0", meaning that it is in a state where the data storage area has been allocated but the memory write is not completed.

The data storage area having the area ID 801 set to "area 2" has the allocation flag 804 set to "1" and the memory write completion flag 805 set to "1", meaning that it is in a state where the data storage area has been allocated and the memory write has been completed. In this case, the MP 3 notifies transfer complete to the memory controller 11 (transfer completion notice (B)).

The data storage area having the area ID 801 set to "area 0" has the allocation flag 804 set to "0" and the memory write completion flag 805 set to "0", meaning that this data storage area has been backed up to the nonvolatile memory 6 after completion of memory write, and both flags have been cleared. It is also possible to provide a field in the management table 1 81 to distinguish the destage (storage) status to the system drive 9, and then have the allocation flag 804 and the memory write completion flag 805 cleared after performing the destaging process.

<Memory Capacity Allocation Process 1>

Figure 9:
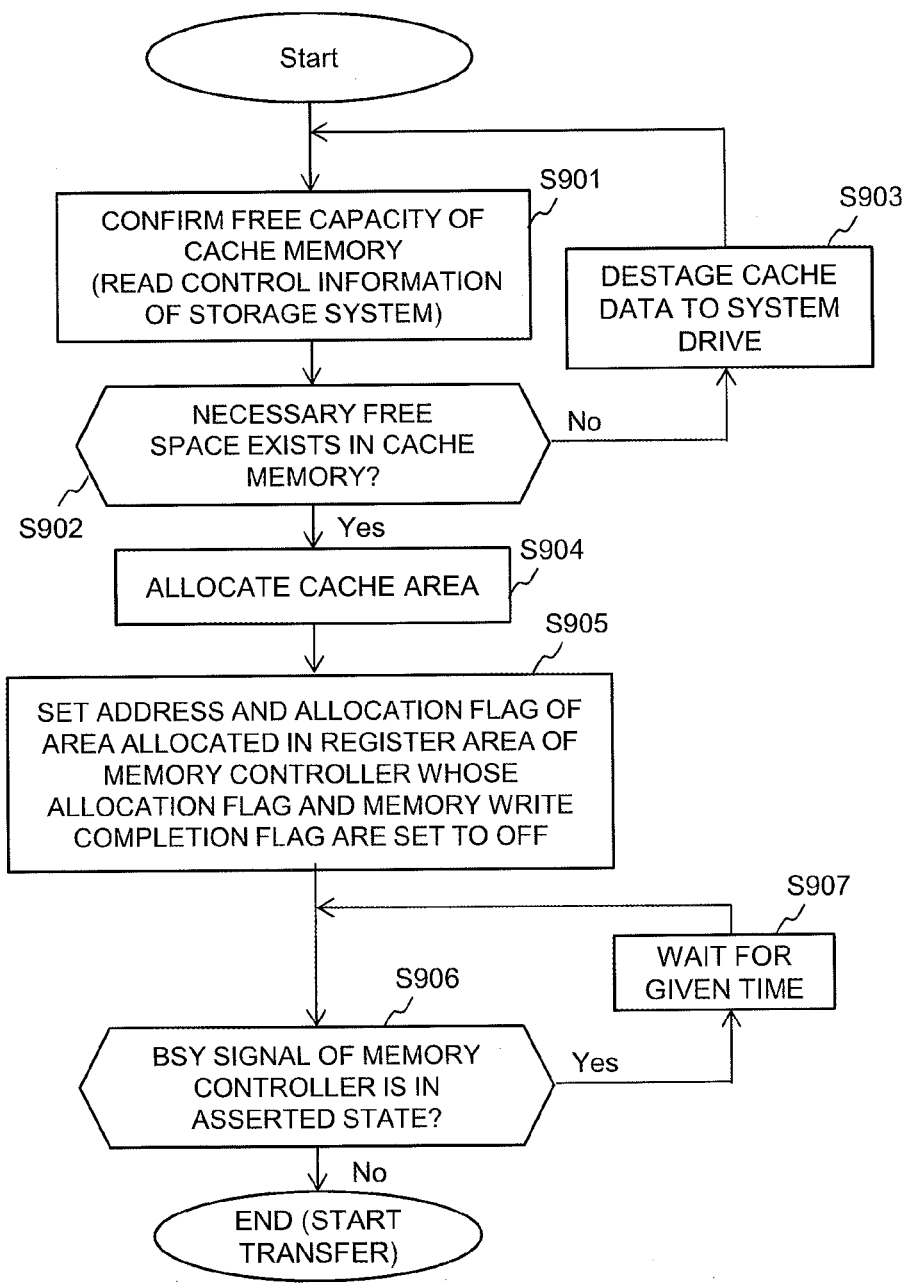
FIG. 9 is a flowchart illustrating a first memory capacity allocation process.

FIG. 9 is a flowchart illustrating a first memory capacity allocation process.

In S901, the MP 3 confirms the free capacity (free area) in the cache memory. That is, the MP 3 reads the control information of a shared memory (not shown) of the storage system 100, and confirms the free capacity (free area). In S902, the MP 3 determines whether necessary free area exists in the cache memory 5 or not. If not (No), the MP 3 executes S903, and if necessary area exists (Yes), it executes S904. In S903, the MP 3 destages the data stored in the cache memory 5 to the storage drive 9 so as to allocate the necessary free area.

In S904, the MP 3 allocates the free area allocated in S902 and S903 as a cache area for storing data. In S905, the MP 3 stores the information on the start address and the end address of the cache area allocated in S904 to the area in the storage register of the management table 1 of the memory controller 11 whose allocation flag 804 and memory write completion flag 805 are set to "OFF (0)", and sets the allocation flag 804 to "ON (1)". In other words, the aforementioned information is stored in an entry where the area ID 801 is "area 0" in the management table 1 80 of FIG. 8 (where the memory write completion flag 805 is set to "0"). The memory write completion flag 805 is still set to "OFF (0)".

In S906, the MP 3 determines whether the BSY signal 113 of the memory controller 11 is in an asserted state or not by reading the value of the BSY signal register 114. If it is in an asserted state (Yes), the MP 3 executes S906 and waits for a given time (standby) to wait for the charged quantity of the battery 8 to increase, and then re-executes S906 to determine the status of the BSY signal 113. If the BSY signal 113 is not in an asserted state (No), the MP 3 starts data transfer to the cache memory 5.

As described, according to the present invention, at first, a storage area is allocated in the cache memory 5. Thereafter, data will not be written in the allocated area if the BSY signal is in an asserted state (state where battery capacity for backing up the non-backed-up area is insufficient), so that it is possible to prevent the loss of cache memory data during power failure due to insufficient battery charge quantity.

<Memory Capacity Allocation Process 2>

Figure 10:
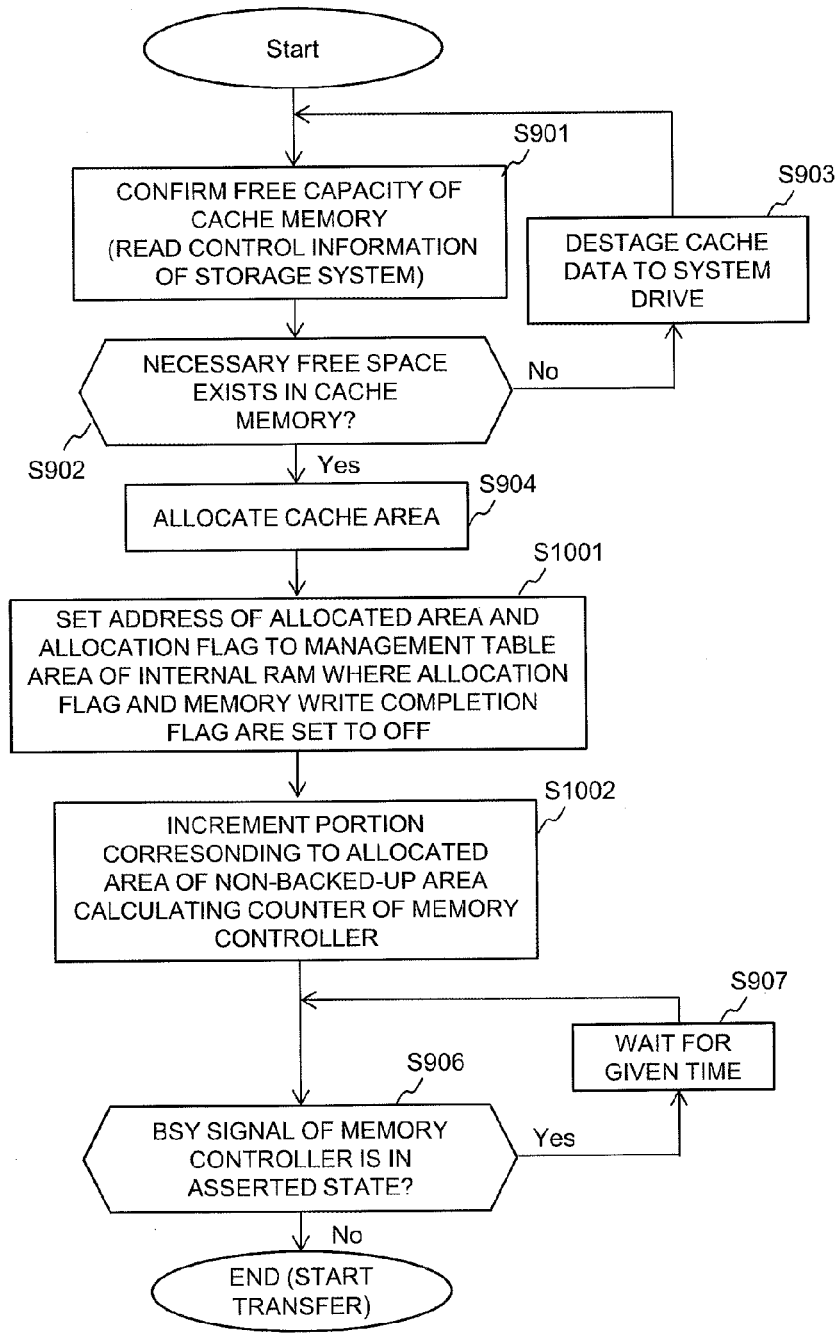
FIG. 10 is a flowchart illustrating a second memory capacity allocation process.

FIG. 10 is a flowchart showing a second memory capacity allocation process. Only the differences from FIG. 9 are described with reference to FIG. 10.

In S1001, the MP 3 stores information on the start address and the end address of the cache area allocated in S904 to the management table area of the internal RAM 14 for storing the management table 1 where the allocation flag 804 and the memory write completion flag 805 are set to "OFF (0)", and sets the allocation flag 804 to "ON (1)". At this time, the memory write completion flag 805 is still set to "OFF (0)". In S1002, the non-backed-up area calculating counter 115 of the memory controller 11 is incremented corresponding to the allocated area (capacity). The effect similar to FIG. 9 can be achieved according to the example of FIG. 10.

<Backup Process 1>

Figure 11:
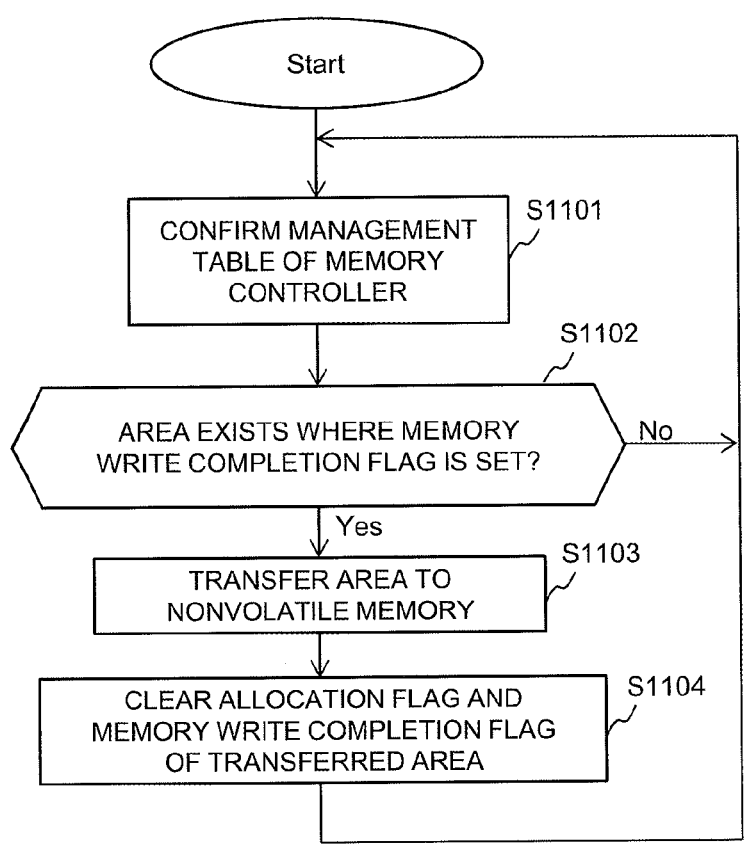
FIG. 11 is a flowchart illustrating a first backup process.

FIG. 11 is a flowchart illustrating a first backup process.

In S1101, a backup-controlling microcontroller 7 confirms the contents of the register 112 storing the management table 1 of the memory controller 11. In S1102, the backup-controlling microcontroller 7 determines whether there is an area where the memory write completion flag 805 is set to "1 (ON)". If such area does not exist (No), the backup-controlling microcontroller 7 executes S1101 again, and if such area exists (Yes), it executes S1103.

In S1103, the backup-controlling microcontroller 7 transfers the area where the memory write completion flag 805 is set to "1 (ON)" to the nonvolatile memory 6 for backup. In S1104, the backup-controlling microcontroller 7 clears the allocation flag 804 and the memory write completion flag 805 of the area where transfer has been completed. This state is shown as the entry where the area ID 801 is "area 0" in FIG. 8.

The backup process from S1101 to S1104 is performed either constantly or periodically by the backup-controlling microcontroller 7. By combining the BSY signal and the constant backup process of the backup-controlling microcontroller 7, it becomes possible to use the cache memory area efficiently while maintaining the following relationship: non-backed-up area<backup enabled area. Therefore, even when the size of the battery is reduced, the influence to performance can be minimized while maintaining the reliability of the storage system. In other words, the advantage of the present invention is that the battery capacity to be implemented is determined first, and then the performance of the storage system is determined based on the capacity of the implemented battery, so that the battery capacity can be set small depending on the purpose of use of the storage system (such as an environment of use where data read process is the main operation). Further, since the battery capacity to be implemented can be reduced, the mounting space of the battery to the storage system 100 can be reduced, by which the system can be downsized and costs can be reduced due to the reduced number of components.

<Backup Process 2>

Figure 12:
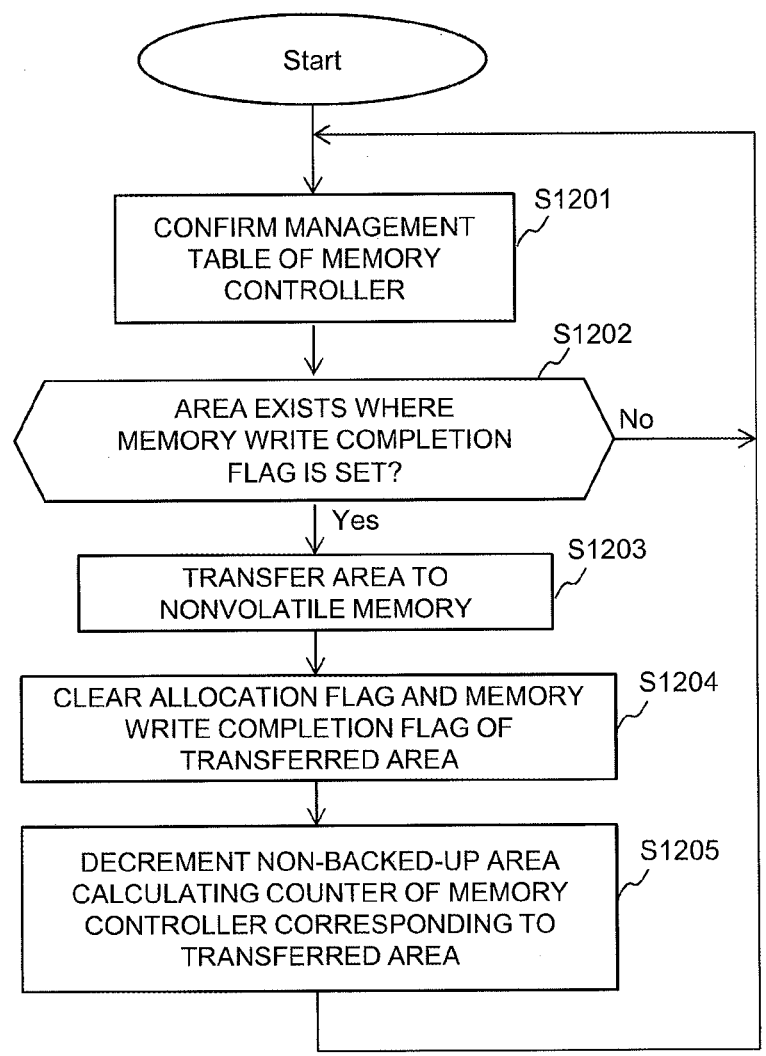
FIG. 12 is a flowchart illustrating a second backup process.

FIG. 12 is a flowchart illustrating a second backup process.

In S1201, the backup-controlling microcontroller 7 confirms the contents of an internal RAM 14 for storing the management table 1 in the memory controller 11. In S1202, the backup-controlling microcontroller 7 determines whether an area exists where the memory write completion flag 805 is set to "1 (ON)". If such area does not exist (No), the backup-controlling microcontroller 7 executes S1201 again, and if such area exists (Yes), it executes S1203.

In S1203, the backup-controlling microcontroller 7 transfers the area where the memory write completion flag 805 is set to "1 (ON)" to the nonvolatile memory 6 for backup. In S1204, the backup-controlling microcontroller 7 clears the allocation flag 804 and the memory write completion flag 805 of the area where transfer has been completed. In S1205, the backup-controlling microcontroller 7 transfers the non-backed-up area calculating counter 115 of the memory controller 11 to the nonvolatile memory 6, and decrements the portion of the backed up area (portion corresponding to capacity).

<Backup Corresponding Relationship>

Figure 13:
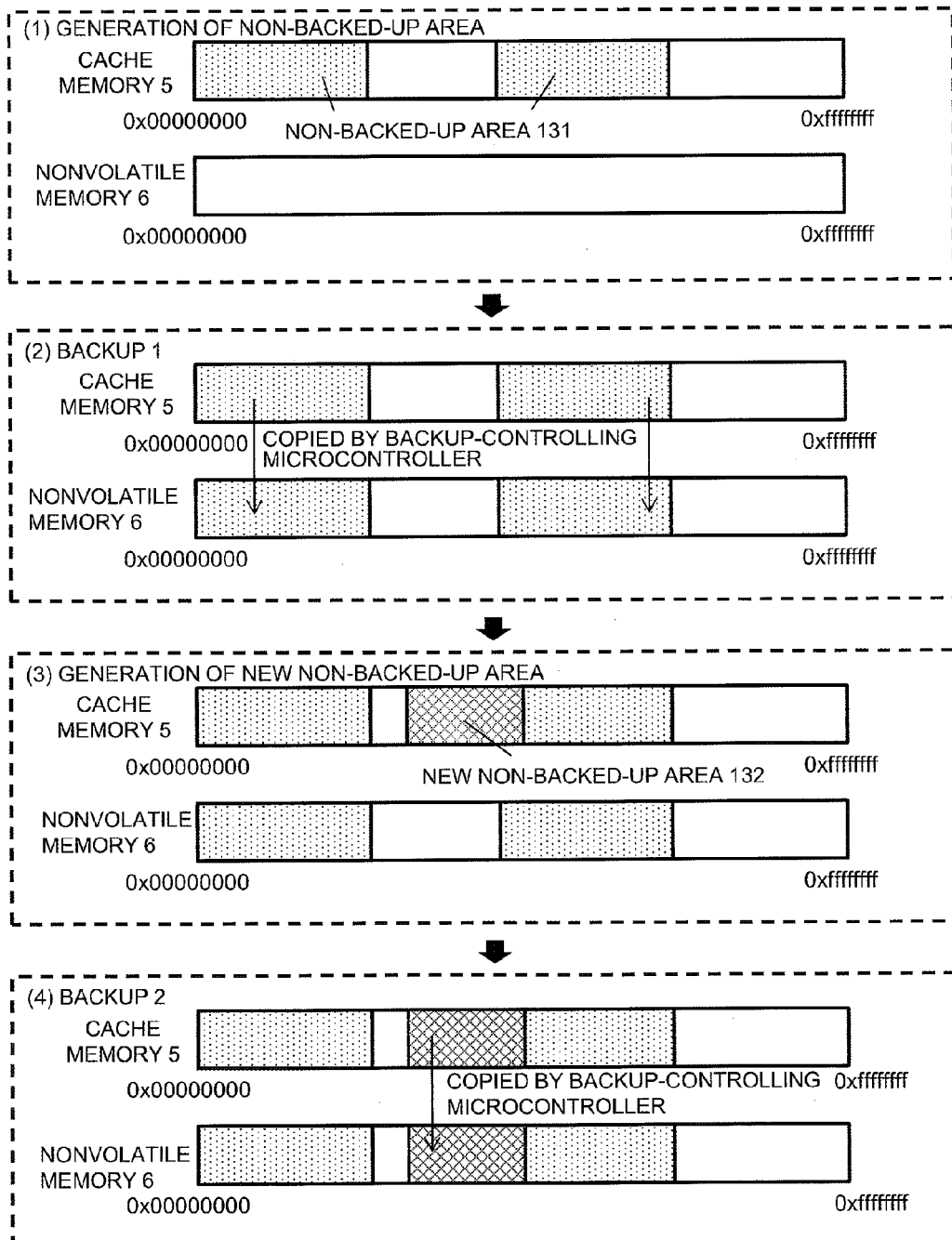
FIG. 13 is a view illustrating a corresponding relationship between a volatile memory and a nonvolatile memory during data backup.

FIG. 13 is a view illustrating a corresponding relationship between a volatile memory and a nonvolatile memory during data backup.

(a1) Generation of Non-Backed-Up Area

The storage system 100 has a nonvolatile memory 6 having a same capacity as the cache memory 5 (DIMM: Dual Inline Memory Module), and both memories are allocated in an address space from 0x00000000 to 0xffffffff (hexadecimal). When a non-backed-area 131 is generated in the cache memory 5, the backup-controlling microcontroller 7 detects the same.

(a2) Backup 1

The backup-controlling microcontroller 7 copies the detected non-backed-up area 131 of the cache memory 5 to the same address area of the nonvolatile memory 6 and performs backup. The backup-controlling microcontroller 7 matches the contents of the cache memory 5 and the contents of the nonvolatile memory 6 by this copy operation.

(a3) Generation of New Non-Backed-Up Area

When a new non-backed-up area 132 is generated in the cache memory 5, similar to (a1), the backup-controlling microcontroller 7 detects the same.

(a4) Backup 2

The backup-controlling microcontroller 7 copies the detected new non-backed-up area 132 of the cache memory 5 to the same address area of the nonvolatile memory 6 for backup. The backup-controlling microcontroller 7 performs backup to the nonvolatile memory 6 every time a new non-backed-up area is generated in the cache memory 5, so that the contents of both memories correspond.

<Concept of Data Copy Process During Power Failure and Power Restoration>

Figure 14:
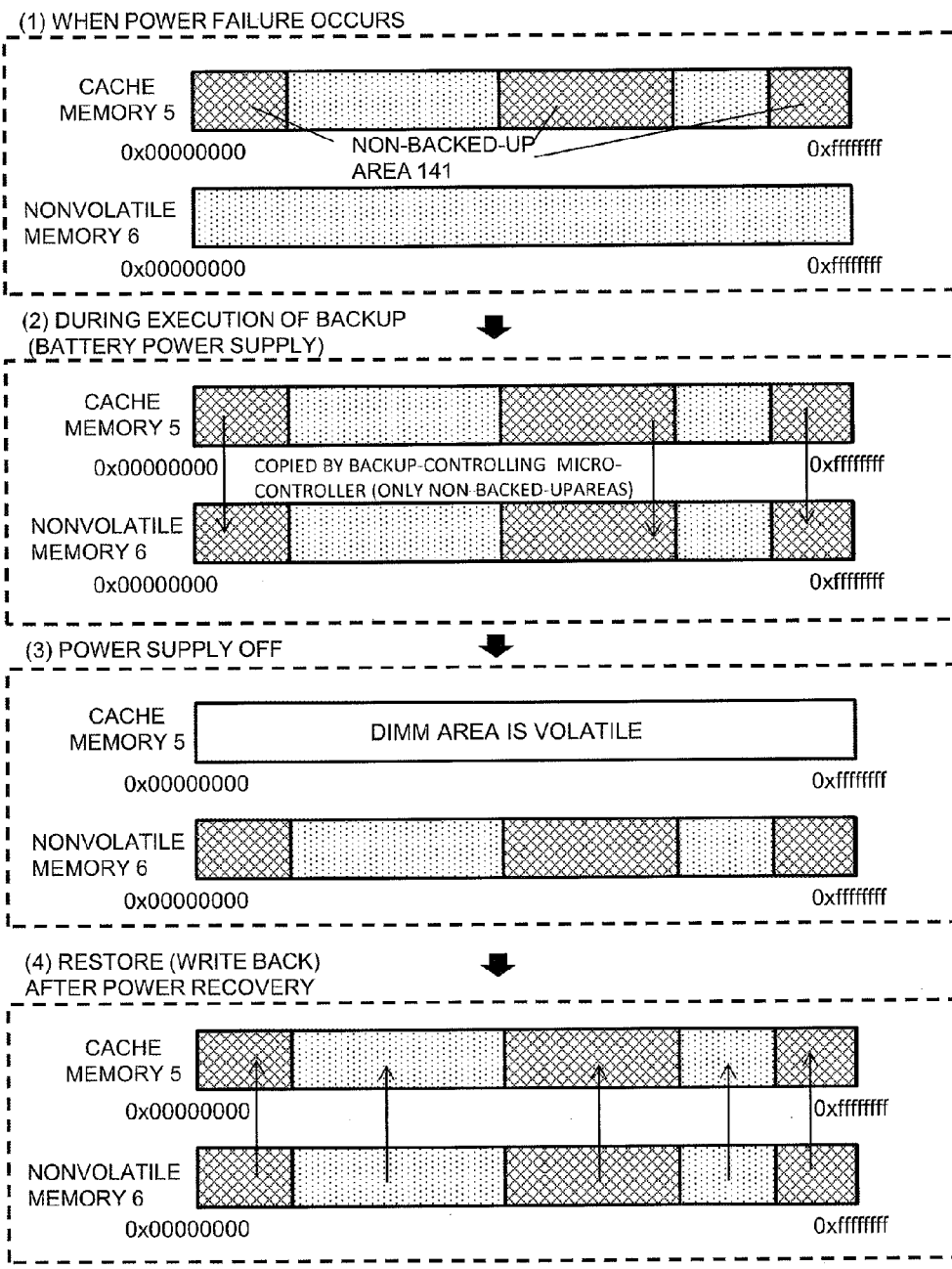
FIG. 14 is a view illustrating the concept of a data copy process during power failure and during power restoration.

FIG. 14 is a view illustrating the concept of a data copy process during power failure and power restoration.

(b1) During Occurrence of Power Failure

During occurrence of power failure, a non-backed-up area 141 exists in the cache memory 5.

(b2) During Execution of Backup (Power Supplied from Battery)

The backup-controlling microcontroller 7 copies only the non-backed-up area 141 to the nonvolatile memory 6 for backup. Thereby, the contents of the cache memory 5 and the contents of the nonvolatile memory 6 correspond completely.

(b3) Turning OFF of Power Supply

When the power supply is turned off, the data in the cache memory 5, which is a volatile memory, is volatized and lost. However, the data is backed up in the nonvolatile memory 6.

(b4) Restoration of Data (Write-Back) after Power Restoration

After the power of the external power supply is restored, the backup-controlling microcontroller 7 executes a restore (write-back) operation to copy the data backed up in the nonvolatile memory 6 (all the data from address 0x00000000 to 0xffffffff) to the cache memory 5. Thus, the contents of the cache memory 5 can be returned to the state prior to occurrence of power failure.

<Backup Process 1 During Power Failure>

Figure 15:
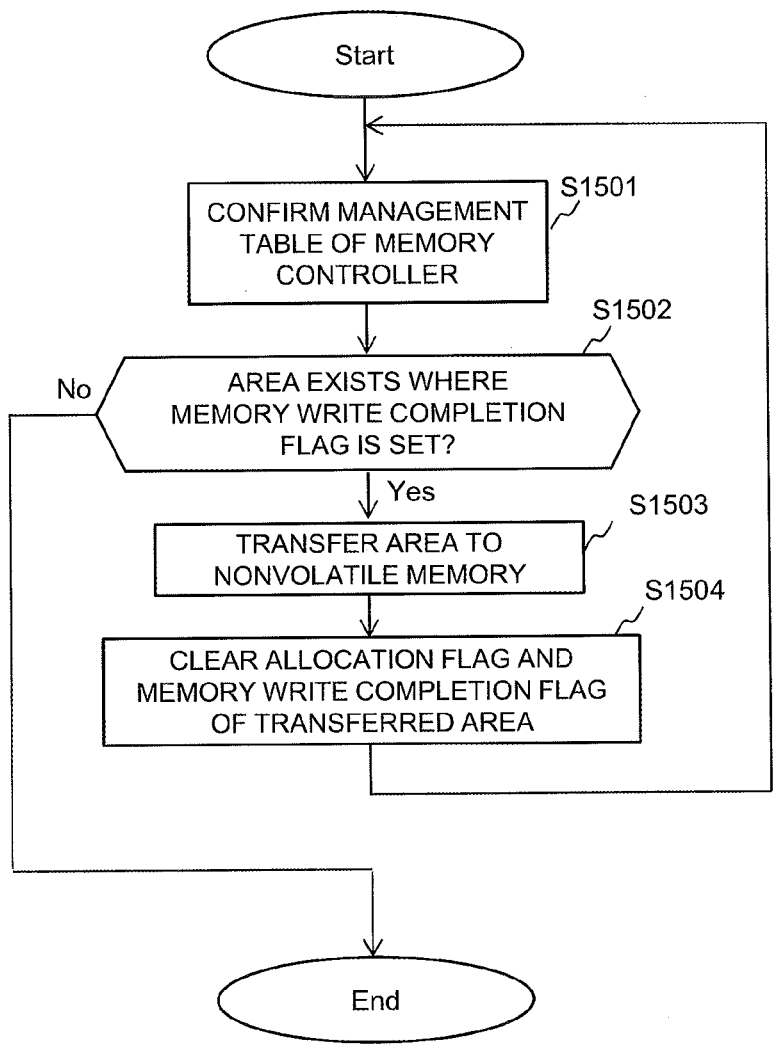
FIG. 15 is a flowchart illustrating a backup process 1 during power failure.

FIG. 15 is a flowchart showing a backup process 1 during power failure.

In S1501, the backup-controlling microcontroller 7 confirms the contents of the storage register 112 storing the management table 1 or the internal RAM 14 for storing the management table 1 of the ASIC 1. In S1502, the backup-controlling microcontroller 7 determines whether an area where the memory write completion flag 805 is set (non-backed-up area) exists or not in the management table 1 81. If such area exists (Yes), the backup-controlling microcontroller 7 executes S1503, and if not (No), it ends the backup process.

In S1503, the backup-controlling microcontroller 7 transfers the relevant area (non-backed-up area) to the nonvolatile memory 6. In S1504, the backup-controlling microcontroller 7 clears the allocation flag 804 and the memory write completion flag 805 of the transferred area. Then, the backup-controlling microcontroller 7 executes the process of S1501 and subsequent steps until there is no more non-backed-up area. According to this process, as shown in (b2) of FIG. 14, the contents of the cache memory 5 and the contents of the nonvolatile memory 6 can be matched, and there will be no problem even if the contents of the cache memory 5 is lost when the power is turned off.

<Overall System 3>

Figure 16:
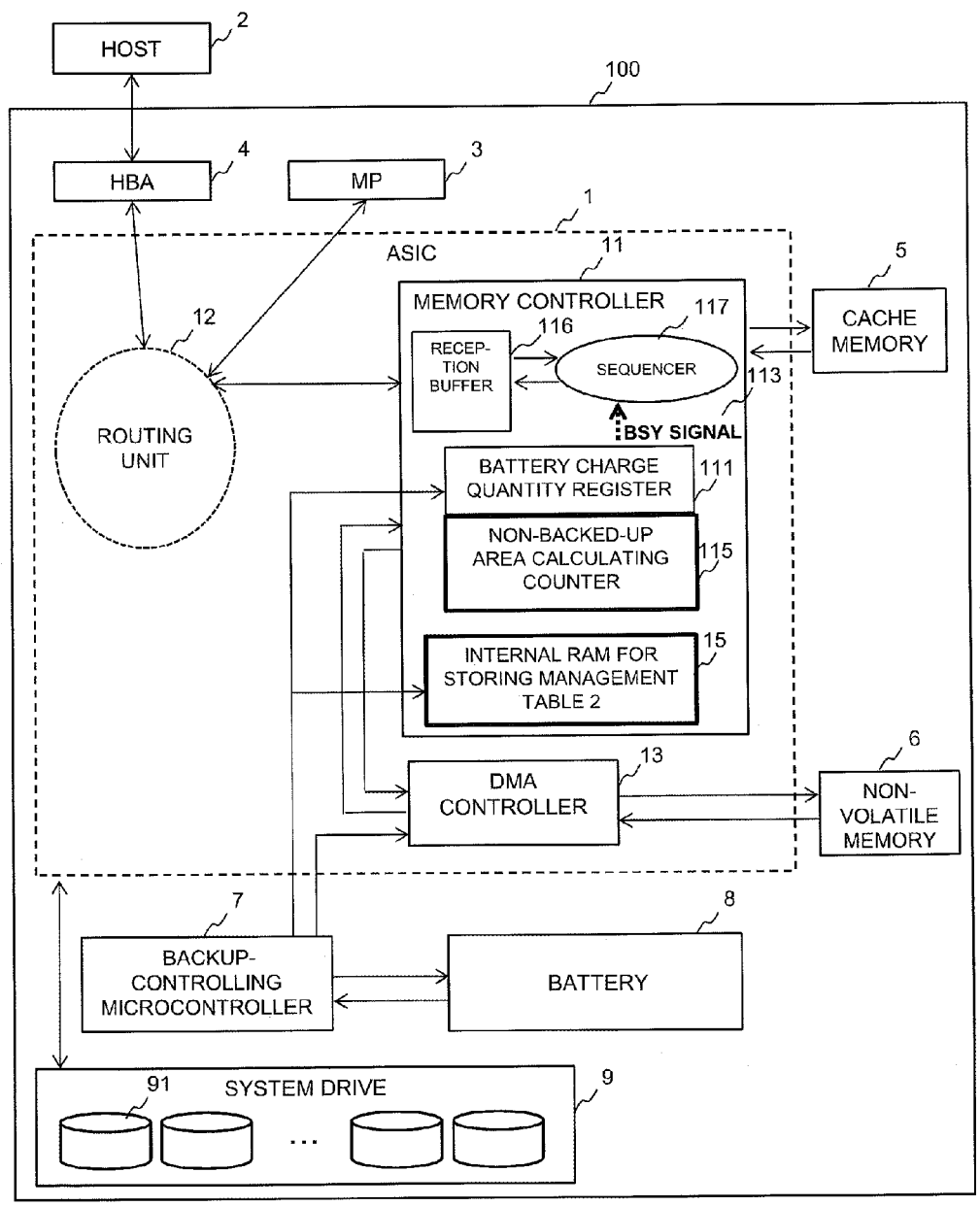
FIG. 16 is an overall block diagram of a third storage system.

FIG. 16 is an overall block diagram of a third storage system. FIG. 16 illustrates a control method 3 where the memory controller 11 will not accept reception of packets (write command and write data) from the routing unit 12 in a state where the BSY signal is asserted. In FIG. 16, only the differences with FIG. 2 are described.

An internal RAM 15 for storing a management table 2 corresponds to the internal RAM 14 for storing the management table 1, and stores a header of a write-access packet sent to the memory controller 11. A reception buffer 116 is a memory (register) for temporarily retaining packets from the routing unit 12. A sequencer 117 is a hardware (logical circuit) for controlling the access to the cache memory 5. The sequencer 117 will not write the contents of the reception buffer 116 to the cache memory 5 in a state where the BSY signal 113 is asserted.

The BSY signal 113 is asserted when the backup enabled area (backup-enabled data capacity or backup enabled time) calculated from the set value of the battery charge quantity register 111 is smaller than the non-backed-up area (backup required data capacity or required backup time), as shown in FIG. 4. Further, the non-backed-up area is a sum of the capacity calculated from a transfer length included in a memory write access header of the area where the non-backed-up flag of a management table 2 illustrated in FIG. 17 mentioned later is "1 (ON)".

<Management Table 2>

FIG. 17 is a view illustrating a configuration example of a management table 2 for managing the status of area allocation and backup. A management table 2 170 includes an area ID 1701 for uniquely identifying areas, a memory write access header 1702 including a start address and a transfer length, and a non-backed-up flag 1703 for determining whether it is a non-backed-up area or not.

The management table 2 170 stores the header of a packet subjected to write access to the memory controller 11 to an entry where the non-backed-up flag 1703 is cleared ("0 (OFF)" state), and sets the non-backed-up flag 1703 to "1

(ON)" state. The capacity of the non-backed-up area is the sum of the capacity calculated from the transfer length included in the memory write access header 1702 of the areas where the non-backed-up flag 1703 is set to "1 (ON)". When the backup-controlling microcontroller 7 completes transfer of the header data having the non-backed-up flag 1703 set to the nonvolatile memory 6, it clears the contents of the memory write access header 1702 and the non-backed-up flag 1703.

<Memory Capacity Allocation Process 3>

Figure 18:
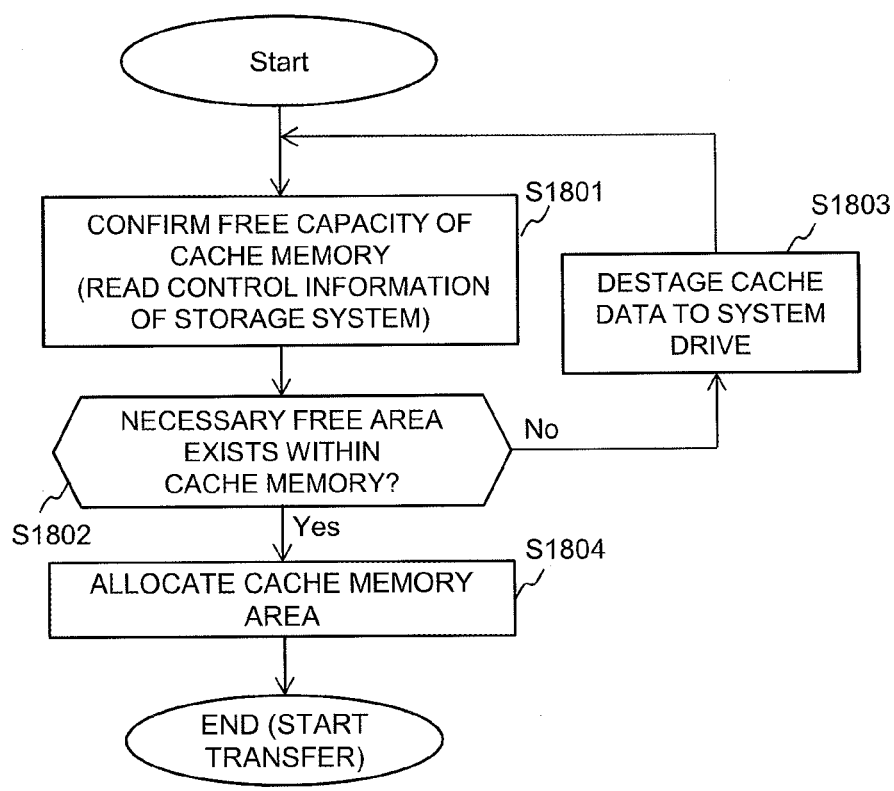
FIG. 18 is a flowchart illustrating a third memory capacity allocation process.

FIG. 18 is a flowchart illustrating a third memory capacity allocation process. The processes from S1801 to S1804 of FIG. 18 are the same as the processes from S901 to S904 of FIG. 9. When the processes from S1801 to S1804 have been completed, the MP 3 starts data transfer to the cache memory 5. The memory controller 11 receives the data from the MP 3 by the reception buffer 116. However, when the BSY signal 113 is in an asserted state, the memory controller 11 controls the sequencer 117 so that the data of the reception buffer 116 is not transferred to the cache memory 5. The BSY signal is generated by the hardware (logical circuit) illustrated in FIG. 4.

<Backup Process 3>

Figure 19:
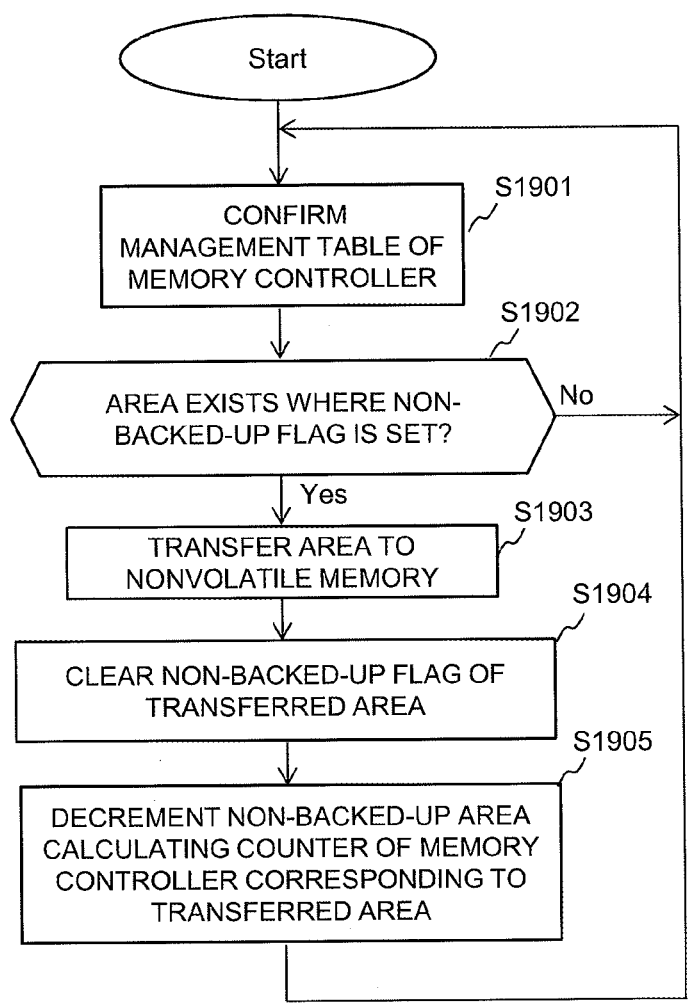
FIG. 19 is a flowchart illustrating a third backup process.

FIG. 19 is a flowchart illustrating a third backup process.

In S1901, the backup-controlling microcontroller 7 confirms the contents of the internal RAM 15 for storing the management table 2 of the memory controller 11. In S1902, the backup-controlling microcontroller 7 determines whether there is an area where the non-backed-up flag 1703 is set to "1 (ON)" or not. If there isn't (No), the backup-controlling microcontroller 7 executes S1901 again, and if there is (Yes), it executes S1903.

In S1903, the backup-controlling microcontroller 7 transfers the area where the non-backed-up flag 1703 is set to "1 (ON)" to the nonvolatile memory 6 for backup. In S1904, the backup-controlling microcontroller 7 clears the non-backed-up flag 1703 of the area where transfer has been completed, and deletes the contents of the memory write access header 1702. In S1905, the backup-controlling microcontroller 7 transfers the non-backed-up area calculating counter 115 of the memory controller 11 to the nonvolatile memory 6, and decrements the portion (capacity) of the backed-up area.

According to the present control method 3, it is not necessary to provide the BSY signal register 114, and the process for confirming the set contents of the BSY signal register 114 by the MP 3 becomes unnecessary, so that the processing performance of the whole storage system 100 can be improved.

<Backup Process 2 During Power Failure>

Figure 20:
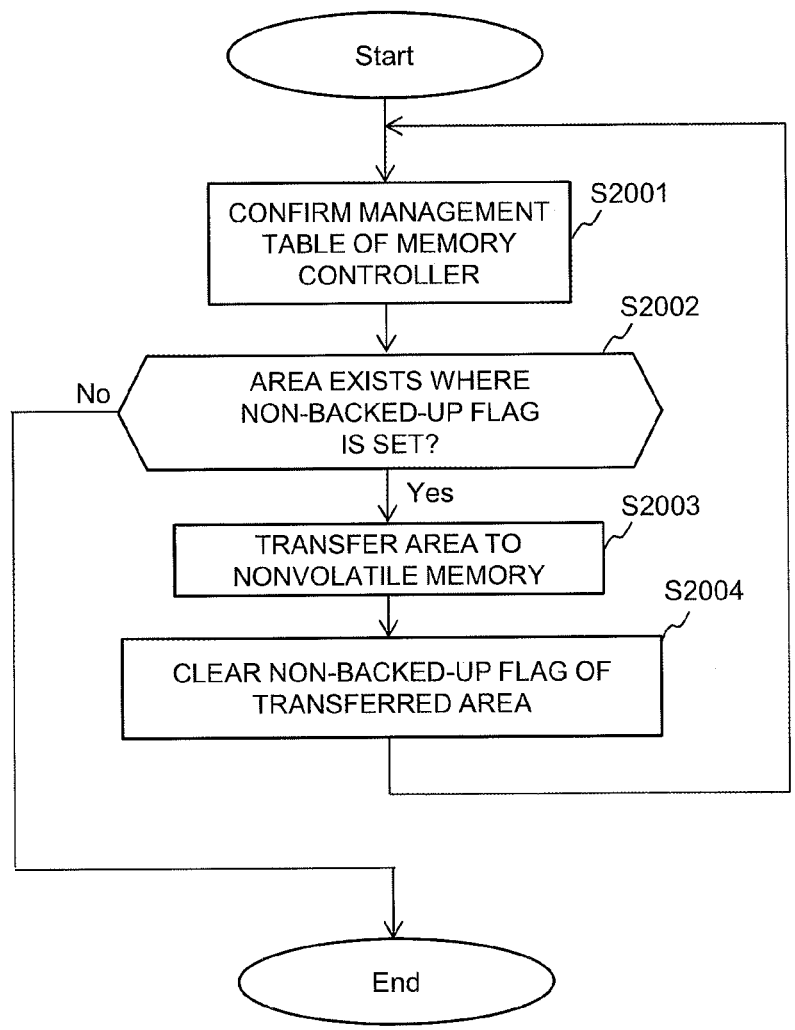
FIG. 20 is a flowchart illustrating a second backup process during power failure.

FIG. 20 is a flowchart illustrating a backup process 2 during power failure.

In S2001, the backup-controlling microcontroller 7 confirms the contents of the internal RAM 15 for storing the management table 2 of the ASIC 1. In S2002, the backup-controlling microcontroller 7 determines whether there exists an area (non-backed-up area) where the non-backed-up flag 1703 is set in the management table 1 81. If there is (Yes), the backup-controlling microcontroller 7 executes S2003, and if not (No), it ends the backup process.

In S2003, the backup-controlling microcontroller 7 transfers the relevant area (non-backed-up area) to the nonvolatile memory 6. In S2004, the backup-controlling microcontroller 7 clears the non-backed-up flag 1703 of the transferred area. Then, the backup-controlling microcontroller 7 executes the processes of S2001 and thereafter until there is no more non-backed-up area. Thereby, as shown in (b2) of FIG. 14, it becomes possible to match the contents of the cache memory 5 and the contents of the nonvolatile memory 6, and no problem will occur even if the contents of the cache memory 5 is evaporated (lost) when the power is turned off.

As described, according to the storage system of the present invention, when storing data from the host computer or the system drive to a volatile memory, the area corresponding to the storage data capacity that can be saved using an internal power supply to the nonvolatile memory is allocated in advance. Then, after the area that can be saved by the internal power supply is allocated, the data from the host computer or the system drive is stored in that area of the nonvolatile memory. Therefore, it becomes possible to prevent data loss when failure such as power failure occurs to the external power supply.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

A portion or whole of the above-illustrated configurations, functions, processing units, processing means and so on can be realized via hardware configuration, such as by designing an integrated circuit. Further, the configurations and functions illustrated above can be realized via software in the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD.

Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

1: ASIC, 2: Host computer, 3: MP, 4: HBA, 5: Cache memory, 6: Nonvolatile memory, 7: Backup-controlling microcontroller, 8: Battery, 9: System drive, 11: Memory controller, 12: Routing unit, 13: DMA controller, 14: Internal RAM for storing management table 1, 15: Internal RAM for storing management table 2, 80: Management table 1, 91: HDD, 111: Battery-charged quantity register, 112: Register storing management table 1, 113: BSY signal, 114: BSY signal register, 115: Non-backed-up area calculating counter, 116: Reception buffer, 117: Sequencer, 170: management table 2

The invention claimed is:

1. A storage system connected to a host computer, comprising:
 a storage drive storing data of the host computer;
 a volatile memory storing data of the host computer or the storage drive;

a nonvolatile memory performing backup of the contents of the volatile memory;

a processor for controlling the saving of data in the volatile memory to the nonvolatile memory; and a chargeable/dischargeable internal power supply for supplying power to the storage system when the power supply from an external power supply is cut off;

wherein the processor:

calculates a write data capacity during writing of data from the host computer or the storage drive to the volatile memory;

measures a charged power quantity accumulated in the internal power supply, and based on the measured charged power quantity, calculates a data capacity that can be saved to the nonvolatile memory using the internal power supply when power supply from the external power supply is cut off; and if the write data capacity is smaller than the savable data capacity, allocates an area for storing the write data in the volatile memory, stores an area information indicating the allocated area in the processor, and performs data write.

2. The storage system according to claim 1, wherein if the write data capacity is greater than the savable data capacity, writing of data will not be performed to the volatile memory.

3. The storage system according to claim 1, wherein the processor calculates a required time for saving data to the nonvolatile memory based on the write data capacity, calculates a possible time for saving data to the nonvolatile memory based on the savable data capacity, and when the possible time for saving data is greater than the required time for saving data, allocates the area for storing the write data in the volatile memory and performs data write.

4. The storage system according to claim 1, wherein the area information is composed of an area ID for uniquely identifying the area, a write start address and a write end address of the area, an allocation flag indicating a status of allocation of the area, and a write complete flag indicating the status of storage of the write data to the area.

5. The storage system according to claim 4, wherein the write start address, the write end address and the allocation flag to the area in the area information is set by allocating the area for storing the write data;

the write complete flag is set by completing the writing of data to the area; and the allocation flag and the write complete flag are cleared by completing saving of data to the nonvolatile memory.

6. The storage system according to claim 5, wherein the processor comprises:

a backup function unit for measuring a charged power quantity accumulated in the internal power supply and saving data from the volatile memory to the nonvolatile memory;

a direct memory access function unit for performing data access between the volatile memory and the nonvolatile memory, and data access between the host computer or the storage drive and the volatile memory; and a memory access function unit for performing data access to the volatile memory.

7. A method for controlling a storage system connected to a host computer, comprising:

a storage drive storing data of the host computer;

a volatile memory storing data of the host computer or the storage drive;

a nonvolatile memory performing backup of the contents of the volatile memory;

a processor for controlling the saving of data in the volatile memory to the nonvolatile memory; and a chargeable/dischargeable internal power supply for supplying power to the storage system when the power supply from an external power supply is cut off;

wherein the processor:

calculates a write data capacity during writing of data from the host computer or the storage drive to the volatile memory;

measures a charged power quantity accumulated in the internal power supply, and based on the measured charged power quantity, calculates a data capacity that can be saved to the nonvolatile memory using the internal power supply when power supply from the external power supply is cut off; and if the write data capacity is smaller than the savable data capacity, allocates an area for storing the write data in the volatile memory, stores an area information indicating the allocated area in the processor, and performs data write.

8. The method for controlling a storage system according to claim 7, wherein if the write data capacity is greater than the savable data capacity, writing of data will not be performed to the volatile memory.

9. The method for controlling a storage system according to claim 7, wherein the processor calculates a required time for saving data to the nonvolatile memory based on the write data capacity, calculates a possible time for saving data to the nonvolatile memory based on the savable data capacity, and when the possible time for saving data is greater than the required time for saving data, allocates the area for storing the write data area to the volatile memory and performs data write.

* * * * *